United States Patent [19]

Dawson et al.

[11] Patent Number: 5,559,163
[45] Date of Patent: Sep. 24, 1996

[54] UV CURABLE COATINGS HAVING IMPROVED WEATHERABILITY

[75] Inventors: William R. Dawson, Matteson; Goutam Gupta, Homewood, both of Ill.

[73] Assignee: The Sherwin-Williams Company, Cleveland, Ohio

[21] Appl. No.: 298,730

[22] Filed: Aug. 31, 1994

Related U.S. Application Data

[63] Continuation of Ser. No. 189,812, Jan. 31, 1994, which is a continuation-in-part of Ser. No. 27,933, Mar. 8, 1993, abandoned, which is a continuation of Ser. No. 647,377, Jan. 28, 1991, abandoned.

[51] Int. Cl.$^6$ ..................................................... C08F 2/50
[52] U.S. Cl. ............................. 522/75; 522/22; 522/40; 522/43; 522/183
[58] Field of Search ........................... 522/22, 183, 75, 522/40, 43

[56] References Cited

U.S. PATENT DOCUMENTS

| | | | |
|---|---|---|---|
| Re. 27,281 | 2/1992 | Wilkus et al. | 260/46.5 |
| 2,592,311 | 4/1952 | Meyer et al. | 260/45.85 |
| 2,835,649 | 5/1958 | Nicholson | 260/45.85 |
| 2,955,128 | 10/1960 | Bailey | 260/468.2 |
| 2,968,643 | 1/1961 | Bailey | 260/46.5 |
| 2,999,835 | 9/1961 | Goldberg | 260/42 |
| 3,028,365 | 4/1962 | Schnell et al. | 260/47 |
| 3,169,121 | 2/1965 | Goldberg | 260/47 |
| 3,230,194 | 1/1966 | Boyle | 260/45.8 |
| 3,334,154 | 8/1967 | Kim | 260/860 |
| 3,391,109 | 7/1968 | Wilkus et al. | 260/46.5 |
| 3,574,617 | 4/1971 | Skoultchi | 96/35.1 |
| 3,616,367 | 10/1971 | Zunker | 204/159.16 |
| 3,629,165 | 12/1971 | Holdstock | 260/2.5 |
| 3,642,681 | 2/1972 | Hermes et al. | 260/29.6 |
| 3,707,397 | 12/1972 | Gagnon | 117/72 |
| 3,708,225 | 1/1973 | Misch et al. | 351/160 |
| 3,759,807 | 9/1973 | Osborn et al. | 204/159.23 |
| 3,835,003 | 9/1974 | Schlesinger | 204/159.11 |
| 3,840,448 | 10/1974 | Osborn et al. | 204/159.14 |
| 3,865,588 | 2/1975 | Ohto et al. | 96/33 |
| 3,926,641 | 12/1975 | Rosen | 96/115 P |
| 3,944,702 | 3/1976 | Clark | 428/288 |
| 3,966,573 | 6/1976 | Bean | 204/159.23 |
| 3,968,305 | 7/1976 | Oshima et al. | 428/334 |
| 3,968,309 | 7/1976 | Matsuo et al. | 428/409 |
| 3,976,497 | 8/1976 | Clark | 106/287 |
| 3,981,897 | 9/1976 | Crivello | 260/440 |
| 3,986,997 | 10/1976 | Clark | 260/29.2 M |
| 4,026,826 | 5/1977 | Yoshida et al. | 260/2 S |
| 4,027,073 | 5/1977 | Clark | 428/412 |
| 4,073,967 | 2/1978 | Sandvig | 427/44 |
| 4,089,763 | 5/1978 | Dart et al. | 204/159.23 |
| 4,101,513 | 7/1978 | Fox et al. | 526/193 |
| 4,105,518 | 8/1978 | McGinnis | 204/159.14 |
| 4,113,592 | 9/1978 | Rybny et al. | 204/159.16 |
| 4,122,233 | 10/1978 | Proskow | 428/412 |
| 4,131,529 | 12/1978 | Osterloh et al. | 204/159.14 |
| 4,136,102 | 1/1979 | Crivello | 260/440 |
| 4,156,035 | 5/1979 | Tsao et al. | 427/44 |
| 4,177,122 | 12/1979 | Sato | 204/159.16 |
| 4,177,315 | 12/1979 | Ubersax | 428/336 |
| 4,181,752 | 1/1980 | Martens et al. | 427/54.1 |
| 4,188,224 | 2/1980 | Felder et al. | 204/159.15 |
| 4,188,451 | 2/1980 | Humphrey | 428/331 |
| 4,188,455 | 2/1980 | Howard | 428/423.1 |
| 4,198,465 | 4/1980 | Moore et al. | 428/409 |
| 4,201,808 | 5/1980 | Cully et al. | 428/40 |
| 4,222,835 | 9/1980 | Dixon | 204/159.16 |
| 4,230,550 | 10/1980 | Vincent . | |
| 4,235,954 | 11/1980 | Humphrey | 428/412 |
| 4,246,038 | 1/1981 | Vaughn et al. | 106/287.16 |
| 4,250,203 | 2/1981 | Schlesinger et al. | 427/44 |
| 4,265,723 | 5/1981 | Hesse et al. | 204/159.23 |
| 4,274,933 | 6/1981 | Kamada et al. | 204/159.24 |
| 4,278,804 | 7/1981 | Ashby et al. | 556/436 |
| 4,298,738 | 11/1981 | Lechtken et al. | 546/22 |

(List continued on next page.)

FOREIGN PATENT DOCUMENTS

| | | | |
|---|---|---|---|
| 228671 | 7/1987 | European Pat. Off. | B05D 3/06 |
| 331087 | 9/1989 | European Pat. Off. | C09D 3/80 |
| 424007 | 10/1989 | European Pat. Off. . | |
| 8202403 | 7/1982 | WIPO | C09D 3/80 |

OTHER PUBLICATIONS

A. Valet, *Light Stabilization Of Radiation Cured Coatings*, Jul. 22, 1992, vol. 182, No. 4311 Polymers Paint Colour Journal, pp. 406–411.

*Hindered Amino Ethers: A New Class of Radical Scavengers For Coatings*, A. Mar and M. Holt, pp. 240–261, Feb. 21–23, 1990.

*Radiation Curable Abrasion Resistant Coatings*, J. O. Blizzard, J. S. Tonge, L. J. Cottington, pp. 171–181, Feb. 26–28, 1992.

Development Project Yields New Generation of Light Stabilizers, Modern Paint and Coatings, Oct. 1989, pp. 162–163.

Improving the Weatherability of Radiation–Cured Coatings, L. R. Gatechair and H. J. Evers III, Modern Paint and Coatings, Apr. 1986.

Data Sheet DAROCUR® 1173 Photoinitiator, EM Industries.

Data Sheet PERMYL® B 100 Ultraviolet Absorber, Ferro Corporation.

Provisional Technical Information, LUCIRIN® LR 8728, BASF.

Preliminary Data, CYASORB® UV416 Light Stabilizer, Cyanamide.

Preliminary Product Information Bulletin, TINUVIN® 123 Light Stabilizer, Ciba–Geigy Corporation.

*Primary Examiner*—Veronica P. Hoke
*Attorney, Agent, or Firm*—Heidi A. Boehlefeld; Robert E. McDonald; Steven W. Tan

[57] ABSTRACT

UV curable coatings comprising at least one photoinitiator and at least one photopolymerizable UV absorber, wherein the photoinitiator has the ability to absorb a significant portion of the total energy needed to cure the coating from wavelengths in which the UV absorber does not appreciably absorb.

32 Claims, No Drawings

U.S. PATENT DOCUMENTS

| | | | |
|---|---|---|---|
| 4,310,600 | 1/1982 | Cross | 428/447 |
| 4,315,970 | 2/1982 | McGee | 428/412 |
| 4,339,474 | 7/1982 | Kishida et al. | 427/54.1 |
| 4,344,830 | 8/1982 | Olson | 204/159.16 |
| 4,348,462 | 9/1982 | Chung | 428/412 |
| 4,372,835 | 2/1983 | Chung et al. | 204/159.13 |
| 4,384,026 | 5/1983 | Moore et al. | 428/412 |
| 4,439,494 | 3/1984 | Olson | 428/412 |
| 4,455,205 | 6/1984 | Olson et al. | 204/159.13 |
| 4,472,021 | 9/1984 | Ansel et al. | 350/96.23 |
| 4,474,857 | 10/1984 | Vaughn, Jr. | 428/446 |
| 4,478,876 | 10/1984 | Chung | 427/54.1 |
| 4,486,504 | 12/1984 | Chung | 428/412 |
| 4,491,508 | 1/1985 | Olson et al. | 204/159.13 |
| 4,511,596 | 4/1985 | Berner . | |
| 4,587,346 | 5/1986 | Winter et al. | 548/260 |
| 4,636,408 | 1/1987 | Anthony et al. | 427/160 |
| 4,644,077 | 2/1987 | Gupta | 556/457 |
| 4,691,059 | 9/1987 | Mitra et al. | 568/333 |
| 4,721,734 | 1/1988 | Gehlhaus et al. | 522/75 |
| 4,822,665 | 4/1989 | Scholz et al. | 428/222 |
| 4,863,802 | 9/1989 | Moore et al. | 428/412 |
| 4,902,724 | 2/1990 | Moore | 522/40 |
| 4,902,725 | 2/1990 | Moore | 522/42 |
| 4,914,143 | 4/1990 | Patel | 522/148 |
| 4,946,531 | 8/1990 | Crouch et al. | 156/242 |
| 4,973,612 | 11/1990 | Cottington et al. | 522/84 |
| 5,075,348 | 12/1991 | Revis et al. . | |
| 5,112,890 | 5/1992 | Behrens et al. | 524/95 |
| 5,124,378 | 6/1992 | Behrens et al. . | |
| 5,126,394 | 6/1992 | Revis et al. . | |
| 5,141,990 | 8/1992 | McKoy et al. | 522/75 |
| 5,162,390 | 11/1972 | Tilley et al. | 522/75 |
| 5,214,085 | 5/1993 | Patel et al. | 522/75 |
| 5,227,240 | 7/1993 | Tilley et al. | 522/75 |
| 5,242,719 | 9/1993 | Medford et al. | 427/515 |
| 5,248,805 | 9/1993 | Boettcher et al. | 558/270 |
| 5,258,225 | 11/1993 | Katsamberis | 428/331 |
| 5,318,850 | 6/1994 | Pickett et al. | 428/412 |
| 5,369,140 | 11/1994 | Valet et al. | 522/75 |

UV CURABLE COATINGS HAVING IMPROVED WEATHERABILITY

This application is a continuation of Ser. No. 08/189,812, filed Jan. 31, 1994, which is a continuation-in-part of application Ser. No. 08/027,933, filed Mar. 8, 1993, now abandoned, which is a continuation of application Ser. No. 07/647,377 filed Jan. 28, 1991, now abandoned.

FIELD OF THE INVENTION

This invention relates to UV curable coatings having improved weatherability, and more particularly, to UV curable coatings containing a photopolymerizable UV absorber and a photoinitiator which provides longer wavelength UV absorption.

BACKGROUND OF THE INVENTION

Polycarbonate resins are widely used for producing molded articles because they are economical and relatively easy to mold. In addition, the resulting molded articles are lighter in weight and have better impact resistance than glass articles. However, because of insufficient surface hardness, such molded polycarbonate articles are susceptible to surface damage by contact, impact or abrasion with other objects. These polycarbonate articles are also susceptible to damage by light. Exposure to ultraviolet light for a long period of time typically causes the polycarbonate article to undergo discoloration, such as yellowing or fogging.

To improve the abrasion resistance and weatherability of the polycarbonate articles and of polystyrene and other articles, the surface of the article may be coated with an ultraviolet curable coating, such as an acrylate-based coating. These coatings typically contain a photoinitiator and an ultraviolet (UV) absorber. The UV absorber provides weathering protection to the underlying polycarbonate substrate and helps to prevent microcracking of the coating itself. However, as the amount of UV absorber in the curable coating increases, the curable coating tends to cure rather poorly, due in part to the absorption of a substantial portion of the curing radiation by the UV absorber and probably to migration of UV absorber to the coating surface during UV cure. At high concentrations, the absorber deprives the coating's photoinitiator of a portion of the ultraviolet energy necessary to properly cure the coating and detracts from the abrasion resistance of the coating surface.

It is an object of the present invention, therefore, to provide an ultraviolet curable coating containing a relatively large amount of UV absorber that is capable of being sufficiently cured. It is a further object of the present invention to provide an ultraviolet curable coating having excellent abrasion resistance and weatherability.

SUMMARY OF THE INVENTION

The present invention comprises the selection of a unique combination of photoinitiators and UV absorbers for use in UV curable coatings. In particular, the present invention utilizes the combination of at least one photoinitiator with at least one UV absorber wherein the photoinitiator has a portion of its absorption wavelength component in an area of the electromagnetic spectrum in which the UV absorber is substantially transparent. The photoinitiator is thus able to secure the amount of radiation necessary to effectively cure the UV curable coating without having to reduce the amount of UV absorber present to a point wherein the weathering benefit is sacrificed or compromised. Preferably, the selection process is such that the absorption spectrum of the photoinitiator does not extend appreciably into the visible spectrum as this promotes a level of yellowing in the coating which is generally unacceptable for clear, optical quality coatings.

Thus, the present invention relates to UV curable coating compositions comprising: (a) at least one photoinitiator selected from the group consisting of acylphosphine oxides, Michler's ketone, benzil, 2-chlorothioxanthone, 2,4-diethylthioxanone, 2,4-diisopropylthioxanone, 2-benzyl-2-(dimethylamino)-1-(4-(4-morpholinyl)phenyl)-1-butanone, camphoroquinone and mixtures thereof; and (b) at least one photopolymerizable UV absorber; wherein the photoinitiator has the ability to absorb a significant portion of the total energy needed to cure the coating from wavelengths in which the UV absorber does not appreciably absorb. The coating composition may also contain a hindered amine light stabilizer.

DETAILED DESCRIPTION OF THE INVENTION

The ultraviolet coating composition of the present invention comprises a photopolymerizible composition, at least one photoinitiator and at least one ultraviolet absorber. The photoinitiator and UV absorber are specifically selected so that the photoinitiator has a portion of its absorption wavelength component in an area of the spectrum in which the UV absorber is substantially transparent (i.e. does not appreciably absorb).

The use of a photopolymerizable UV absorber in the coating composition of the present invention enables the UV absorber to be more uniformly retained throughout the body of the coating during the coating process since the photopolymerizable UV absorber will copolymerize with the monomers in the coating. Traditional, non-polymerizable UV absorbers are typically forced toward the surface of the coating during the curing process. This increased concentration of UV absorber near the surface adversely impacts the coating's ability to cure completely and/or maintain good surface hardness.

The UV absorbers useful in the composition of the present invention are strong UV absorbers that exhibit relatively high absorption values in the UV-A range of about 320–380 nm, but are relatively transparent above about 380 nm. Preferred are UV absorbers belonging to the group of photopolymerizable hydroxybenzophenones and photopolymerizable benzotriazoles. Examples of such UV absorbers include 2-hydroxy-4-acryloyloxyethoxy benzophenone commercially available as CYASORB® UV416 from American Cyanamid Company, 2-hydroxy-4-(2 hydroxy-3-methacryIyloxy) propoxybenzophenone, and photopolymerizable benzotriazoles having the following structures:

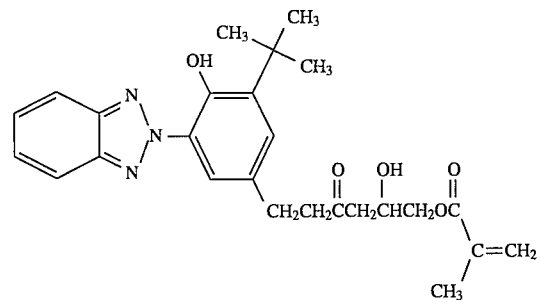

(PBT in Table II)

and

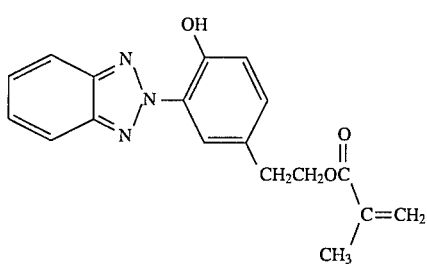

commercially available as NORBLOC® 7966 from Noramco. Other photopolymerizable UV absorbers that may be used in the coating composition of the present invention include photopolymerizable, ethylenically unsaturated triazines, salicylates, aryl-substituted acrylates and polymerizable versions of other effective UV absorbers, and mixtures of these UV absorbers.

Non-polymerizable UV absorbers can also be used in minor amounts in combination with the polymerizable UV absorbers. Non-polymerizable UV absorbers are well known in the art and include benzotriazoles, benzophenones, piperdinyl esters, substituted acrylates, and salicylates. Representative non-polymerizable UV absorbers are listed in Table I. Other useful non-polymerizable UV absorbers are listed in U.S. Pat. No. 4,636,408, which is incorporated herein by reference. The amount of polymerizable UV absorber and/or non-polymerizable UV absorber used in the composition of the present invention is about 0.5–20% of the weight of the total composition and preferably about 4–15% of the weight of the total composition. Non-polymerizable UV absorbers may be used alone in the coating composition to produce UV curable coatings having utility, but these non-polymerizable UV absorbers do not provide the advantageous performance of the polymerizable UV absorbers.

Hindered amine light stabilizers (HALS), which function as co-stabilizers, may also be added to the coating composition. Generally, co-stabilizers are non-absorbing or low absorbing in the ultraviolet or visible regions of the spectrum, above about 320 nm. Examples of hindered amine light stabilizers include those listed and recited in U.S. Pat. Nos. 5,112,890 and 4,636,408, which are incorporated herein by reference. When the coating composition of the present invention contains silica, low basicity hindered amine compounds are preferred. Such HALS include 2,2,6, 6-tetraalkylpiperdines such as bis(1-octyloxy- 2,2,6,6-tetramethyl-4-piperidinyl) sebacate commercially available as TINUVIN® 123 from Ciba Geigy and hindered amines having the structures:

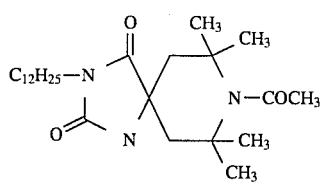

commercially available as TINUVIN® 440 and

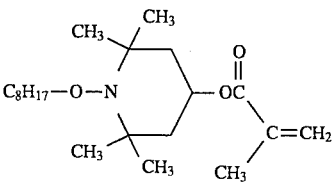

a polymerizable HALS. Preferably, the coating composition of the present invention contains bis(1-octyloxy-2,2,6,6-tetramethyl-4-piperidinyl) sebacate HALS. The amount of HALS present in the coating composition of the present invention is within the range of about 0–5.0% by weight of the total composition and preferably, within the range of about 0.5–2.5% by weight.

The photoinitiator useful in the composition of the present invention comprises at least one photoinitiator that has the ability to absorb energy in wavelengths in the range greater than about 380 nm. Examples of such photoinitiators include: acylphosphine oxides such as 2,4,6-trimethylbenzoyl diphenyl phosphine oxide, benzoyldiethoxyphosphine oxide and 2,4,6-trimethylbenzoyl dinaphthyl phosphine oxide; Michler's ketone; benzil; 2-chlorothioxanthone; 2,4-diethylthioxanthone; 2,4-diisopropylthioxanthone; 2-benzyl-2-(dimethylamino)-1-(4-( 4-morpholinyl)phenyl)-1-butanone commercially available as IRGACURE® 369; camphoroquinone and mixtures thereof. If the photoinitiator absorbs strongly near or beyond 430 nm, it would cause too much yellowing in the coating for use in applications where a water-white coating is required. Therefore, photoinitiators that absorb in the 300 nm to 410 nm range are preferred for most applications. More preferably, the photoinitiator comprises 2,4,6-trimethylbenzoyl diphenyl phosphine oxide, commercially available as LUCIRIN® TPO from BASF.

Additional photoinitiators can be used in combination with the essential photoinitiator described above. These additional photoinitiators can be selected from the group of standard photoinitiators without regard to the criticality of the wave-lengths in which they absorb energy. Examples of such additional photoinitiators include: acyloin and derivatives thereof, such as benzoin, benzoin methyl ether, benzoin ethyl ether, benzoin isopropyl ether commercially available as VICURE-30 from Stauffer Chemicals, benzoin isobutyl ether commercially available as TRIGONAL-14 from Noury, and methylbenzoin; diketones such as diacetyl; aromatic diketones such as anthraquinone; phenones such as acetophenone, 2,2,2-tribromo-1-phenylethanone, 2,2-diethoxyacetophenone, 2,2-dimethoxy-2-phenylacetophenone commercially available as IRGACURE® 651 from Ciba Geigy, 2,2,2-tribromo- 1-(2-nitrophenyl)ethanone, benzophenone, and 4,4-bis(dimethylamino)benzophenone, 2-hydroxy-2-methyl-1-phenyl-propan- 1-one commercially available as DAROCUR® 1173 from Ciba Geigy, hydroxycyclohexyl phenyl ketone commercially available as IRGACURE® 184 from Ciba Geigy, 2-methyl-l-(4-(methylthio)phenyl)- 2-morpholino-propanone-1 commercially available as IRGACURE® 907 from Ciba Geigy, 2,2-dichloro-1-(4 phenoxyphenyl)ethanone commercially available as SANDORAY-1000 from Sandoz, chlorinated benzophenone aryl ketone commercially available as FI-4 from Eastman Kodak, and α-isobutyl-α-phenyl acetophenone commercially available as VICURE-10 from Stauffer Chemicals.

The total amount of photoinitiator present in the UV curable coating composition is generally in the range of about 0.05–7% by weight of the total composition, preferably between about 0.2% and about 2%. At least about 2% of the total photoinitiator weight percentage is contributed by the essential photoinitiator.

UV curable coatings which benefit from this invention include any UV curable coating which contains both a photoinitiator and a UV absorber. Generally, these coatings contain a binder, a photoinitiator, a UV absorber, a flow leveling agent and a hardening additive. Silica is preferably added to the coating composition to improve the abrasion resistance of the coating. More preferably, colloidal silica treated according to the process of U.S. Pat. No. 4,644,077, incorporated herein by reference, is included in the coating composition of the present invention.

The binder preferably contains monomers selected from alkyl di- and tri- acrylates such as, for example, ethylene glycol diacrylate, 1,3-propylene glycol diacrylate, 1,4-butanediol diacrylate, 1,4-cyclohexane diacrylate, 1,6-hexanediol diacrylate, neopentyl glycol diacrylate, 1,5-pentanediol diacrylate, 1,8-octanediol diacrylate, trimethylol propane triacrylate, pentaerythritol triacrylate, pentaerythritol tetraacrylate, and dipentaerythritol pentaacrylate. Monomers with other types of saturation can be substituted for up to 33% of the acrylate functional monomers. Such unsaturation could include allyl, vinyl, fumaric and crotonic saturation. Examples of preferred binders are diethyleneglycol diacrylate combined with trimethylolpropane triacrylate and hexanediol diacrylate combined with trimethylolpropane triacrylate.

A preferred coating composition according to the present invention comprises about 35–80% hexanediol diacrylate, about 5–25% trimethylolpropane triacrylate, about 0.5–20% of a photopolymerizable benzotriazole or benzophenone UV absorber, about 0–5% of a hindered amine light stabilizer, about 0.05–7% (2,4,6-trimethylbenzoyl) diphenyl phosphine oxide, about 0.05–2% of Byk 310, and about 8–40% treated colloidal silica by weight. The silica preferably has a particle size less than about 0.3 microns so that the resulting coating is not cloudy.

A more preferred coating composition according to the present invention comprises about 50–65% hexanediol diacrylate, about 5–20% trimethylolpropane triacrylate, about 4–15% of a photopolymerizable benzotriazole or benzophenone UV absorber, about 0.5–2.5% of a hindered amine light stabilizer, about 0.5–2.0% (2,4,6-trimethylbenzoyl) diphenyl phosphine oxide, about 0.1–1% of Byk 310, and about 14–25% treated colloidal silica by weight.

The following examples demonstrate specific embodiments and performance attributes of this invention. The examples are illustrative only and are not intended to limit the scope of this invention.

EXAMPLES 1–25

Several UV curable coating compositions were produced as shown in Table II. The coating compositions were tested at 0.4 mil, 0.8 mil, 1.0 mil and 1.2 mil film thicknesses on LEXAN® substrates for the following:

1. Number of UV passes required for good surface cure: line speed 15 feet/minute at focus under one Fusion System H lamp. (Table III).

2. Abrasion Test: haze change measured in percent resulting from 300 cycles with a Taber Abraser. (Table IV).

3. Yellowness Test: Yellowness Index (ASTM D1925). (Table V).

4. Coatings 11–14, 19–21, and 24–25 on LEXAN® substrates were also tested on the QUV Weatherometer using FS40 and UVA340 bulbs to assess the effect of UV absorber concentration on haze increase. (Table VI).

Table III shows that coating compositions prepared according to the present invention require fewer passes under the UV lamp to achieve a good surface cure. Specifically, comparing Example 10 to Example 4, Example 11 to Example 5, and Example 12 to Example 6, it can be seen that for equal amounts of UV absorber in the coating composition, the coatings containing photopolymerizable UV absorber require significantly fewer UV passes to obtain a good surface cure than those coatings containing a non-polymerizable UV absorber. Table III further shows that coating compositions containing up to 15% by weight of a photopolymerizable UV absorber (Examples 13 and 25) can be sufficiently cured with a single UV pass.

In addition, Table III shows that coating compositions which did not contain 2,4,6-trimethylbenzoyl diphenyl phosphine oxide (LUCIRIN® TPO) resulted in coatings having poor through-cure as indicated by wrinkling of the film (Examples 1, 2 and 7–9). All coating compositions which included 2,4,6-trimethylbenzoyl diphenyl phosphine oxide produced coatings having complete through-cure without wrinkling after a moderate level of UV cure.

As shown in Table VI, the coating compositions of Examples 13, 24 and 25, which contain 2,4,6-trimethylbenzoyl diphenyl phosphine oxide and a photopolymerizable UV absorber, displayed superior performance properties including fast UV cure speeds, good through-cure and abrasion resistance, and the ability to withstand over 5,000 hours of exposure to irradiation from FS40 or UVA 340 bulbs.

EXAMPLE 26

A reaction vessel was charged with 380.6 parts NALCO® 1057 (30% colloidal silica in 2-propoxyethanol available from Nalco Chemical Company), 24.4 parts water, and 5.7 parts acetic acid, and 0.05 parts phenothiazine. The reactor was heated to 190° F. with slow agitation and low flow of an inert gas blanket. 166.3 parts NALCO® 1057 and 24.1 parts trimethyoxy silane propyl methacrylate (available as Z-6030 from Dow Corning) were premixed and then added to the reaction vessel over a period of 4 hours. The reactor was then cooled to 90° F. and 375 parts 1,6-hexanediol diacrylate and 93.9 parts trimethylolpropane triacrylate were added to the reactor contents.

The resulting coating intermediate was then vacuum distilled using a wiped thin film evaporator with short path distillation under the following conditions to remove substantially all of the water, alcohol and acid: (a) vacuum 20 mm Hg; (b) condenser cooling set point 50°–60° F.; (c) hot oil jacket set point 240° F.; (d) bottoms temperature control 170°–185° F.; (e) vapor temperature control set point 124°–128° F.; and (f) feed rate of 70 lbs./hr/ft$^2$. A second pass through the distillation system under the following conditions was then run: (a) vacuum 1–3 mm Hg; (b) condenser cooling set point 50°–60° F.; (c) hot oil jacket set point 240° F.; (d) bottoms temperature control 195°–198° F.; (e) vapor temperature control set point 104°–108° F.; and (f) feed rate of 50 lbs./hr/ft$^2$.

The stripped coating intermediate was then combined with a binder containing 1,6-hexanediol diacrylate and trimethylolpropane triacrylate, LUCIRIN® TPO and IRGACURE® 184 photoinitiators, NORBLOC® 7966 UV absorber, TINUVIN® 123 hindered amine light stabilizer and BYK-310 flow-leveling agent to produce the following coating composition:

| component | parts by wt. |
|---|---|
| Stripped Intermediate | 573.84 |
| Hexanediol diacrylate | 193.93 |
| Trimethyolpropane triacrylate | 48.56 |
| Irgacure 184 | 51.42 |
| Norbloc 7966 | 52.37 |
| Lucirin TPO | 12.06 |
| Tinuvin 123 | 19.04 |
| Byk-310 | 0.96 |

When applied and cured on a LEXAN® substrate, this coating composition resulted in a coating having excellent through-cure and abrasion resistance.

EXAMPLES 27–32

UV curable coating compositions containing a phosphine oxide photoinitiator, a polymerizable benzophenone UV absorber and surface treated colloidal silica were prepared substantially in accordance with the procedure of Example 26. These specific compositions are listed in Table VII. Examples 27–29 do not contain a hindered amine light stabilizer and Examples 30–32 contain the hindered amine light stabilizer TINUVIN® 123.

The weatherability of coatings produced from the compositions of Examples 27–32 were tested by the EMMAQUA method. Results of these tests are shown in Table VIII. EMMAQUA is a well known weatherability test whereby the coated substrates are exposed to accelerated outdoor weathering in Arizona. EMMAQUA/NTW is an equatorial follow-the-sun exposure rack with mirrors whereby the solar radiation is increased by a factor of almost 10 over a 45° south stationary mount. This exposure is combined with a periodic water spray during night time hours. Haze, percent transmission and yellowness index (ASTM D-1925) were measured for coatings of various thicknesses before and after exposure. Exposure levels were 600 MJ/m$^2$ and 1000 MJ/m$^2$ for all coatings. Additionally, the 600 MJ/m$^2$ test panels for coatings of compositions 27, 30 and 32 were subjected to another 600 MJ/m$^2$ of exposure (1200 MJ/m$^2$ total exposure).

TABLE I

NON-PHOTOPOLYMERIZABLE UV ABSORBERS

| Trade Name | Supplier | Composition |
|---|---|---|
| 1. Hydroxyphenyl benzotriazoles | | |
| Tinuvin P | Ciba Geigy | 2-(2'-hydroxy-5'-methylphenyl) benzotriazole |
| Tinuvin 320 | Ciba Geigy | 2-(3',5'-dialkyl-2'-hydroxyphenyl)benzotriazole |
| Tinuvin 326 | Ciba Geigy | 2-(3'-tert-butyl-2'-hydroxy-5-methylphenyl)-5-chlorobenzotriazole |
| Tinuvin 327 | Ciba Geigy | 2-(3',5'-di-tert-butyl-2'-hydroxyphenyl)-5-chloro- |
| Tinuvin 328 | Ciba Geigy | benzotriazole 2-(3',5'-dialkyl-2'hydroxyphenyl)benzotriazole |
| Tinuvin 900 | Ciba Geigy | 2-(2-hydroxy-3,5-di(1,1-dimethylbenzyl)phenyl)-2H-benzotriazole |
| Tinuvin 1130 | Ciba Geigy | poly(oxy-1,2-ethanediyl)-α-(3-(3-2H-benzotriazole-2-yl)5-(1,1-dimethylethyl)-4-hydroxyphenyl)-1-oxopropyl-w-hydroxy |
| 2. 2-Hydroxybenzophenones | | |
| Permyl B-100 | Ferro | substituted phenone |
| Cyasorb UV-9 | Am Cy | 2-hydroxy-4-methoxybenzophenone |
| Cyasorb UV-24 | Am Cy | 2,2'-dihydroxy-4-methoxybenzophenone |
| Cyasorb UV-207 | Am Cy | 2-hydroxy-4-methoxy-2'-carboxybenzophenone |
| Cyasorb UV-284 | Am Cy | 2-hydroxy-4-methoxy-5-sulfobenzophenone |
| Cyasorb UV-531 | Am Cy | 2-hydroxy-4-octyloxybenzophenone |
| Uvinul 400 | GAF | 2,4-dihydroxybenzophenone |
| Uvinul 410 | GAF | 4-decyloxy-2-hydroxybenzophenone |
| Uvinul 490 | GAF | mixture of Uvinul D-49 and other tetrasubstituted benzophenones |
| Uvinul D-49 | GAF | 2,2'-dihydroxy-4,4'-dimethoxybenzophenone |
| Uvinul D-50 | GAF | 2,2',4,4'-tetrahydroxybenzophenone |
| Uvinul DS-49 | GAF | sodium 2,2'-dihydroxy-4,4'-dimethoxy-5-sulfobenzophenone |
| Uvinul M-40 | GAF | 2-hydroxy-4-methoxybenzophenone |
| Uvinul MS-40 | GAF | 2-hydroxy-4-methocy-5-sulfobenzophenone |
| Rylex H | DuPont | 4-dodecyloxy-2-hydroxybenzophenone |
| 3. Substituted Acrylates | | |
| Uvinul N-35 | GAF | ethyl 2-cyano-3,3-diphenylacrylate |
| Uvinul N-539 | GAF | 2-ethylhexyl2-cyano-3,3-diphenylacrylate |
| UV Absorber 317 | Naftone | butyl 2-cyano-3-methyl-3-(p-methoxyphenyl)acrylate |
| UV Absorber 318 | Naftone | methyl 2-cyano-3-methyl-3-(p-methoxyphenyl)acrylate |
| UV Absorber 340 | Naftone | N-(β-cyano-β-carbomethoxyvinyl)-2-methylindoline |
| 4. Salicylates | | |
| Salol | Dow | phenyl salicylate |
| TBS | Dow | p-tert-butylphenyl salicylate |
| Inhibitor OPS | Eastman | p-tert-octylphenyl salicylate |
| Sunarome WMO | Felton | 2-ethylhexyl salicylate |

TABLE II

| | COMPOSITION (% by weight) | | | | | | | | | | | | | | |
|---|---|---|---|---|---|---|---|---|---|---|---|---|---|---|---|
| No. | A | B | C | D | E | F | G | H | I | J | K | L | M | N | O |
| 1 | 16.2 | 4.0 | 0 | 0 | 5.0 | 0 | 0 | 59.8 | 15.0 | 0 | 0 | 0 | 0 | 0 | 0 |
| 2 | 16.2 | 6.0 | 0 | 0 | 5.0 | 0 | 0 | 58.2 | 14.6 | 0 | 0 | 0 | 0 | 0 | 0 |
| 3 | 16.2 | 10.0 | 0 | 0 | 5.0 | 0 | 0 | 55.0 | 13.8 | 0 | 0 | 0 | 0 | 0 | 0 |

TABLE II-continued

| | COMPOSITION (% by weight) | | | | | | | | | | | | | | |
|---|---|---|---|---|---|---|---|---|---|---|---|---|---|---|---|
| No. | A | B | C | D | E | F | G | H | I | J | K | L | M | N | O |
| 4 | 16.2 | 4.0 | 0 | 0 | 3.75 | 1.25 | 0 | 59.8 | 15.0 | 0 | 0 | 0 | 0 | 0 | 0 |
| 5 | 16.2 | 6.0 | 0 | 0 | 3.75 | 1.25 | 0 | 58.2 | 13.8 | 0 | 0 | 0 | 0 | 0 | 0 |
| 6 | 16.2 | 10.0 | 0 | 0 | 3.75 | 1.25 | 0 | 55.0 | 13.8 | 0 | 0 | 0 | 0 | 0 | 0 |
| 7 | 16.2 | 0 | 4.0 | 0 | 5.0 | 0 | 0 | 59.8 | 15.0 | 0 | 0 | 0 | 0 | 0 | 0 |
| 8 | 16.2 | 0 | 6.0 | 0 | 5.0 | 0 | 0 | 58.2 | 14.6 | 0 | 0 | 0 | 0 | 0 | 0 |
| 9 | 16.2 | 0 | 10.0 | 0 | 5.0 | 0 | 0 | 55.0 | 13.8 | 0 | 0 | 0 | 0 | 0 | 0 |
| 10 | 16.2 | 0 | 4.0 | 0 | 3.75 | 1.25 | 0 | 59.8 | 15.0 | 0 | 0 | 0 | 0 | 0 | 0 |
| 11 | 16.2 | 0 | 6.0 | 0 | 3.75 | 1.25 | 0 | 58.2 | 14.6 | 0 | 0 | 0 | 0 | 0 | 0 |
| 12 | 16.2 | 0 | 10.0 | 0 | 3.75 | 1.25 | 0 | 55.0 | 13.6 | 0 | 0 | 0 | 0 | 0 | 0 |
| 13 | 16.2 | 0 | 15.0 | 0 | 3.75 | 1.25 | 0 | 51.0 | 12.8 | 0 | 0 | 0 | 0 | 0 | 0 |
| 14 | 16.2 | 0 | 0 | 6.0 | 5.0 | 0 | 0.4 | 57.9 | 14.5 | 0 | 0 | 0 | 0 | 0 | 0 |
| 15 | 16.04 | 0 | 0 | 5.94 | 4.95 | 1.0 | 0.39 | 57.32 | 14.36 | 0 | 0 | 0 | 0 | 0 | 0 |
| 16 | 16.2 | 0 | 0 | 0 | 3.75 | 1.25 | 0 | 61.2 | 15.3 | 2.0 | 0 | 0 | 0.3 | 0 | 0 |
| 17 | 16.2 | 0 | 0 | 0 | 3.75 | 1.25 | 0 | 60.4 | 15.1 | 3.0 | 0 | 0 | 0.3 | 0 | 0 |
| 18 | 16.2 | 0 | 0 | 0 | 3.75 | 1.25 | 0 | 59.6 | 14.9 | 4.0 | 0 | 0 | 0.3 | 0 | 0 |
| 19 | 16.2 | 0 | 0 | 0 | 3.75 | 1.25 | 0 | 60.4 | 15.1 | 0 | 3.0 | 0 | 0.3 | 0 | 0 |
| 20 | 16.2 | 0 | 0 | 0 | 3.75 | 1.25 | 0 | 59.6 | 14.9 | 0 | 4.0 | 0 | 0.3 | 0 | 0 |
| 21 | 16.2 | 0 | 0 | 0 | 3.75 | 1.25 | 0 | 58.8 | 14.7 | 0 | 5.0 | 0 | 0.3 | 0 | 0 |
| 22 | 16.2 | 0 | 0 | 0 | 3.75 | 1.25 | 0 | 61.2 | 15.3 | 0 | 0 | 2.0 | 0.3 | 0 | 0 |
| 23 | 16.2 | 0 | 0 | 0 | 3.75 | 1.25 | 0 | 59.6 | 14.9 | 0 | 0 | 4.0 | 0.3 | 0 | 0 |
| 24 | 16.2 | 0 | 0 | 0 | 0 | 1.25 | 0 | 57.2 | 14.3 | 0 | 0 | 0 | 0.3 | 6 | 4.8 |
| 25 | 16.2 | 0 | 0 | 0 | 0 | 1.25 | 0 | 50.0 | 12.5 | 0 | 0 | 0 | 0.3 | 15 | 4.8 |

Key:
A: SiO$_2$*
B: Cyasorb UV9
C: Cyasorb UV416
D: Permyl B100
E: Darocur 1173
F: Lucirin TPO
G: Tinuvin 440
H: Hexanediol diacrylate
I: Trimethylolpropane triacrylate
J: Tinuvin 1130
K: Tinuvin 328
L: Tinuvin 900
M: Byk 310
N: PBT
O: Irgacure 184
*weight of SiO$_2$ prior to treatment with silane according to process of U.S. Pat. No. 4,644,077

TABLE III

| | NO. OF UV PASSES NECESSARY FOR GOOD SURFACE CURE | | | |
|---|---|---|---|---|
| No. | 0.4 mil | 0.8 mil | 1.0 mil | 1.2 mil |
| 1 | 2 | 2 | — | 3 (wr) |
| 2 | 4 | 5 | — | 6 (wr) |
| 3 | 6 | — | — | >10 |
| 4 | 2 | 2 | — | 2 |
| 5 | 5 | 4 | — | 4 |
| 6 | 8 | 11 | — | >12 |
| 7 | 1 | 1 | — | 1 (wr) |
| 8 | 1 | 1 | — | 1 (wr) |
| 9 | 2 | 2 | — | 2 (wr) |
| 10 | 1 | 1 | — | 1 |
| 11 | 1 | 1 | — | 1 |
| 12 | 2 | 1 | — | 1 |
| 13 | 2 | 2 | — | 2 |
| 16 | — | — | 1 | — |
| 17 | — | — | 2 | — |
| 18 | — | — | 3 | — |
| 19 | — | — | 1 | — |
| 20 | — | — | 2 | — |
| 21 | — | — | 3 | — |
| 22 | — | — | 1 | — |
| 23 | — | — | 1 | — |
| 24 | — | — | 1 | — |
| 25 | — | — | 1 | — |

Key:
(wr): wrinkled during UV cure

TABLE IV

| | ABRASION TEST | | | |
|---|---|---|---|---|
| No. | 0.4 mil | 0.8 mil | 1.0 mil | 1.2 mil |
| 1 | 19 | 26 | — | 24 |
| 2 | 35 | 29 | — | 24 |
| 3 | 54 | — | — | — |
| 4 | — | 15 | — | 21 |
| 5 | 29 | 38 | — | 31 |
| 6 | 43 | 76 | — | — |
| 7 | 4.7 | 6.1 | — | 5.5 |
| 8 | 10 | 8.8 | — | 13 |
| 9 | 17 | 21 | — | 17 |
| 10 | 5.4 | 6.5 | — | — |
| 11 | 6.7 | 7.1 | — | 6.7 |
| 12 | 8.5 | 8.2 | — | 8.4 |
| 13 | 12.2 | 11.2 | — | 11.4 |
| 16 | — | — | 3.7 | — |
| 17 | — | — | 3.7 | — |

TABLE IV-continued

ABRASION TEST

| No. | 0.4 mil | 0.8 mil | 1.0 mil | 1.2 mil |
|-----|---------|---------|---------|---------|
| 18 | — | — | 4.8 | — |
| 19 | — | — | 4.3 | — |
| 20 | — | — | 4.6 | — |
| 21 | — | — | 8.2 | — |
| 22 | — | — | 3.2 | — |
| 23 | — | — | 2.8 | — |
| 24 | — | — | 2.7 | — |
| 25 | — | — | 5.5 | — |

Key:
— Not available

TABLE V

YELLOWNESS

| No. | Yellowness Index-D1925 |
|-----|------------------------|
| 7 | 0.1–0.7 |
| 8 | 0.2–0.8 |
| 9 | 0.4–2.2 |
| 10 | 0.0–0.6 |
| 11 | 0.0–0.6 |
| 12 | 0.3–0.8 |
| 16 | 3.2 |
| 17 | 1.9 |
| 18 | 2.4 |
| 19 | 1.8 |
| 20 | 2.3 |
| 21 | 2.6 |
| 22 | 2.0 |
| 23 | 2.6 |
| 24 | 1.6 |
| 25 | 3.0 |

TABLE VI

QUV TESTING

| | | Exp. to give 10% Haze | |
|---|---|---|---|
| No. | UV Absorber | FS40 Bulbs | UVA 340 Bulbs |
| 14 | 6% Permyl B100 | 2000 hrs | 3000 hrs |
| 11 | 6% Cyasorb UV416 | 2000 hrs | — |
| 12 | 10% Cyasorb UV416 | 3500 hrs | — |
| 13 | 15% Cyasorb UV416 | >5000 hrs | 3500 hrs |
| 19 | 3% Tinuvin 328 | — | 4400 hrs |
| 20 | 4% Tinuvin 328 | — | 4600 hrs |
| 21 | 5% Tinuvin 328 | — | 4300 hrs |
| 24 | 6% PBT | — | >5000 hrs |
| 25 | 15% PBT | — | >5000 hrs[a] |

[a]Some crows feet type cracking

TABLE VII

EXAMPLES 27–32
COMPOSITION (% BY WEIGHT)

| No. | Silica* | HDDA | TMPTA | Cyasorb UV416 | Darocur 1173 | Lucirin TPO | Tinuvin 123 |
|-----|---------|------|-------|---------------|--------------|-------------|-------------|
| 27 | 16.5 | 54.8 | 13.7 | 10 | 3.75 | 1.25 | 0 |
| 28 | 16.5 | 52.8 | 13.1 | 12.5 | 3.75 | 1.25 | 0 |
| 29 | 16.5 | 50.8 | 12.7 | 15 | 3.75 | 1.25 | 0 |
| 30 | 16.5 | 53.2 | 13.3 | 10 | 3.75 | 1.25 | 2.0 |
| 31 | 16.5 | 51.2 | 12.8 | 12.5 | 3.75 | 1.25 | 2.0 |
| 32 | 16.5 | 49.2 | 12.3 | 15 | 3.75 | 1.25 | 2.0 |

*weight of $SiO_2$ prior to treatment with silane according to process U.S. Pat. No. 4,644,077

TABLE VIII

EMMAQUA/NTW TEST RESULTS

| Composition | Coating Thickness | HAZE CHANGE | | | | PERCENT TRANSMISSION | | | | YELLOWNESS INDEX | | | |
|---|---|---|---|---|---|---|---|---|---|---|---|---|---|
| | | Orig. | 600 MJ/m² | 1000 MJ/m² | 1200 MJ/m² | Orig. | 600 MJ/m² | 1000 MJ/m² | 1200 MJ/m² | Orig. | 600 MJ/m² | 1000 MJ/m² | 1200 MJ/m² |
| 27 | 0.5 mil | 2.0 | 4.5 | 10.4 | 24 | 90.2 | 90.7 | 89.5 | 85.7 | 1.17 | 2.1 | 3.2 | 4.3 |
| 27 | 1.0 mil | 1.34 | 2.4 | 9.6 | 6.4 | 89.6 | 90.5 | 88.9 | 89.6 | 1.51 | 2.2 | 3.2 | 4.1 |
| 27 | 1.5 mil | 1.0 | 3.4 | 17 | 6.7 | 90.0 | 90.3 | 87.3 | 89.3 | 1.67 | 2.4 | 3.9 | 4.9 |
| 28 | 0.5 mil | 0.89 | 2.6 | 5.9 | — | 90.1 | 90.3 | 90.9 | — | 1.29 | 1.5 | 2.9 | — |
| 28 | 1.0 mil | 0.78 | 2.5 | 5.7 | — | 90.0 | 90.7 | 90.8 | — | 1.58 | 2.1 | 3.3 | — |
| 28 | 1.5 mil | 1.56 | 3.6 | 5.7 | — | 89.9 | 90.4 | 90.6 | — | 1.29 | 2.8 | 3.6 | — |
| 29 | 0.5 mil | 0.67 | 10.63 | 31 | — | 90.2 | 90.4 | 85.5 | — | 0.99 | 2.7 | 3.8 | — |
| 29 | 1.0 mil | 0.56 | 5.6 | 17 | — | 89.9 | 91.3 | 87.5 | — | 1.52 | 2.5 | 3.6 | — |
| 29 | 1.5 mil | 0.89 | 9.3 | 17.7 | — | 89.9 | 90.9 | 89.0 | — | 1.93 | 3.6 | 4.3 | — |
| 30 | 0.5 mil | 1.1 | 3.6 | 2.4 | 4.7 | 90.4 | 90.7 | 91.8 | 90.2 | 0.74 | 1.5 | 2.1 | 2.9 |
| 30 | 1.0 mil | 0.78 | 3.7 | 3.0 | 3.3 | 90.3 | 90.5 | 90.5 | 90.7 | 1.29 | 2.2 | 2.8 | 3.2 |
| 30 | 1.5 mil | 0.78 | 9.6 | 4.0 | 15 | 90.2 | 89.3 | 90.2 | 88.7 | 1.70 | 2.1 | 3.4 | 4.2 |
| 31 | 0.5 mil | 0.78 | 4.4 | 4.7 | — | 90.3 | 90.7 | 89.4 | — | 0.94 | 2.3 | 3.5 | — |
| 31 | 1.0 mil | 1.0 | 5.0 | 7.0 | — | 90.1 | 90.9 | 89.3 | — | 1.46 | 2.6 | 3.4 | — |

TABLE VIII-continued

| | | EMMAQUA/NTW TEST RESULTS | | | | | | | | | | |
|---|---|---|---|---|---|---|---|---|---|---|---|---|
| | | HAZE CHANGE | | | | PERCENT TRANSMISSION | | | | YELLOWNESS INDEX | | |
| Composition | Coating Thickness | Orig. | 600 MJ/m² | 1000 MJ/m² | 1200 MJ/m² | Orig. | 600 MJ/m² | 1000 MJ/m² | 1200 MJ/m² | Orig. | 600 MJ/m² | 1000 MJ/m² | 1200 MJ/m² |
| 31 | 1.5 mil | 0.89 | 5.3 | 6.2 | — | 90.0 | 91.0 | 90.2 | — | 2.0 | 4.7 | 3.9 | — |
| 32 | 0.5 mil | 1.0 | 4.1 | 7–12 | 5.3 | 90.0 | 90.2 | 90.4 | 90.1 | 1.62 | 2.3 | 2.6 | 4.3 |
| 32 | 1.0 mil | 1.67 | 4.8 | 4.3 | 5.3 | 89.8 | 90.4 | 90.9 | 90.1 | 2.40 | 2.4 | 2.9 | 4.7 |
| 32 | 1.5 mil | 1.22 | 3.1 | 4.5 | 5.2 | 89.9 | 90.3 | 90.3 | 90.3 | 2.58 | 3.4 | 3.4 | 5.0 |

What is claimed is:

1. A UV curable coating composition comprising:
   a) at least one photoinitiator selected from the group consisting of acylphosphine oxides, Michler's ketone, benzil, 2-chlorothioxanthone, and mixtures thereof;
   b) at least one photopolymerizable UV absorber having ethylenic unsaturation;
   c) at least one UV curable acrylic monomer: and
   d) silica;
   wherein said photoinitiator has the ability to absorb a significant portion of the total energy needed to cure said coating from wavelengths in which said UV absorber does not appreciably absorb.

2. The UV curable coating composition of claim I wherein said UV absorber comprises a photopolymerizable benzophenone.

3. The UV curable coating composition of claim 1 wherein said photoinitiator comprises an acylphosphine oxide.

4. The UV curable coating composition of claim 1 wherein said photoinitiator comprises 2,4,6-trimethylbenzoyl diphenyl phosphine oxide.

5. The UV curable coating composition of claim 1 wherein said UV absorber comprises 2-hydroxy-4-acryloyloxyethoxy benzophenone.

6. The UV curable coating composition of claim 3 wherein said UV absorber comprises 2-hydroxy-4-acryloyloxyethoxy benzophenone.

7. The UV curable coating composition of claim 1 wherein the UV absorber is a photopolymerizable benzotriazole.

8. The UV curable coating composition of claim 7 wherein the UV absorber is selected from the group consisting of

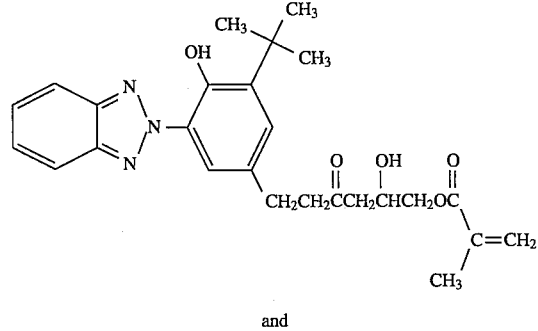

and

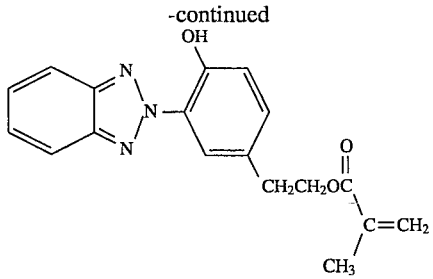

9. The UV curable coating composition of claim 1 comprising a mixture of at least two photoinitiators.

10. The UV curable coating composition of claim 9 wherein said photoinitiator mixture comprises at least about 10% by weight of acylphosphine oxide based on the total weight of photoinitiator.

11. The UV curable coating composition of claim 9 wherein said photoinitiator mixture further comprises a photoinitiator selected from 2-hydroxy-2-methyl-1-phenyl-propan-1-one, and hydroxycyclohexyl phenyl ketone.

12. The UV curable composition of claim 1 wherein the total amount of photoinitiator in the composition comprises between about 0.5% and about 7.0% by weight of the total composition.

13. The UV curable coating composition of claim 9 wherein tile total amount of photoinitiator in the composition comprises between about 0.5% and about 7.0% by weight of the total composition.

14. The UV curable composition of claim 1 wherein said UV absorber is present in an amount of between about 5 % and about 20% by weight of the total composition.

15. The UV curable composition of claim 5 wherein said UV absorber is present in an amount of between about 5% and about 20% by weight of the total composition.

16. The UV curable composition of claim 1 wherein said UV absorber is present in an amount of between about 6% and about 15 % by weight of the total composition.

17. The UV curable composition of claim 5 wherein said UV absorber is present in an amount of between about 6% and about 15% by weight of the total composition.

18. The UV curable composition of claim 1 wherein the silica has been surface treated according to a process comprising:
   a) admixing water and a catalytic amount of acid with a silica organosol comprising silica dispersed in a water-miscible organic solvent;
   b) gradually adding a trialkoxysilane to the admixture under reactive conditions; and
   c) removing substantially all of the water;

wherein the trialkoxysilane is present at a level up to about 30% by weight based upon the weight of the silica and the water is added at an amount up to about 15 % by weight based upon the weight of the water-miscible organic solvent.

19. The UV curable coating composition of claim 18 wherein said trialkoxysilane is polymerizable.

20. The UV curable coating composition of claim 1 further comprising a hindered amine light stabilizer.

21. The UV curable coating composition of claim 20 wherein said hindered amine light stabilizer is selected from the group consisting of bis(1-octyloxy-2,2,6,6-tetramethyl-4-piperdinyl) sebacate,

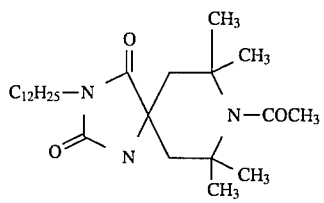

and

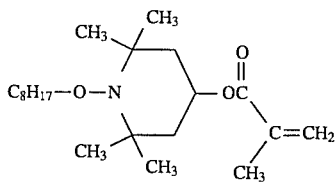

22. The UV curable coating composition of claim 20 wherein said hindered amine light stabilizer comprises bis(1-octyloxy- 2,2,6,6-tetramethyl-4-piperdinyl) sebacate.

23. A UV curable coating composition comprising:
    a) a photoinitiator having the ability to absorb energy from wavelengths above 380 nm;
    b) a photopolymerizable UV absorber having the ability to absorb energy from the range of wavelengths of less than about 340–360 nm and does not appreciably absorb energy above about 380 nm:
    c) at least one UV curable acrylic monomer: and
    d) silica.

24. The UV curable coating composition of claim 23 wherein said photoinitiator is selected from the group consisting of acylphosphine oxides, Michler's ketone, benzil, 2-chlorothioxanthone, and mixtures thereof.

25. The UV curable coating composition of claim 23 wherein said photoinitiator comprises an acylphosphine oxide.

26. The UV curable coating composition of claim 23 wherein said photoinitiator comprises 2,4,6-trimethylbenzoyl diphenyl phosphine oxide.

27. The UV curable coating composition of claim 23 wherein said photopolymerizable UV absorber comprises an ethylenically unsaturated benzophenone.

28. The UV curable coating composition of claim 23 wherein said UV absorber comprises 2-hydroxy-4-acryloyloxyethoxy benzophenone.

29. The UV curable coating composition of claim 23 wherein said UV absorber comprises a photopolymerizable benzotriazole.

30. The UV curable coating of claim 23 wherein said UV absorber is selected from the group comprising

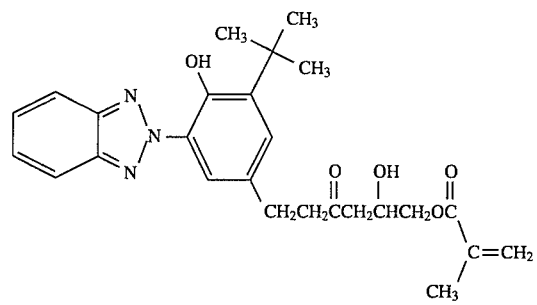

and

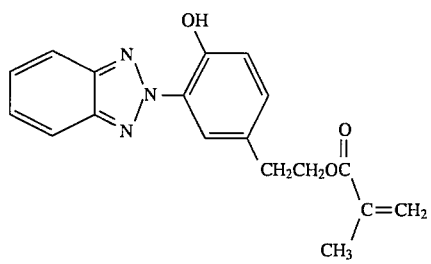

31. The UV curable coating composition of claim 23 wherein the silica has been surface treated according to a process comprising:
    a) admixing water and a catalytic amount of acid with a silica organosol comprising silica dispersed in a water-miscible organic solvent;
    b) gradually adding a trialkoxysilane to the admixture under reactive conditions; and
    c) removing substantially all of the water;
wherein the trialkoxysilane is present at a level up to about 30 % by weight based upon the weight of the silica and the water is added at an amount up to about 15% by weight based upon the weight of the water-miscible organic solvent.

32. The UV curable coating composition of claim 23 further comprising a hindered amine light stabilizer.

* * * * *